(12) United States Patent
Magnus et al.

(10) Patent No.: US 10,865,895 B2
(45) Date of Patent: Dec. 15, 2020

(54) SUBSEA CONTROL VALVE

(71) Applicant: FMC Kongsberg Subsea AS, Kongsberg (NO)

(72) Inventors: Heyn Halfdan Magnus, Kongsberg (NO); Stig Fredrik Mathisen, Kongsberg (NO)

(73) Assignee: FMC Kongsberg Subsea AS, Kongsberg (NO)

( * ) Notice: Subject to any disclaimer, the term of this patent is extended or adjusted under 35 U.S.C. 154(b) by 0 days.

(21) Appl. No.: 16/336,093

(22) PCT Filed: Sep. 22, 2017

(86) PCT No.: PCT/EP2017/074023
§ 371 (c)(1),
(2) Date: Mar. 22, 2019

(87) PCT Pub. No.: WO2018/055083
PCT Pub. Date: Mar. 29, 2018

(65) Prior Publication Data
US 2019/0226590 A1    Jul. 25, 2019

(30) Foreign Application Priority Data

Sep. 22, 2016 (NO) .................................. 20161517

(51) Int. Cl.
*F16K 11/087* (2006.01)
*E21B 34/04* (2006.01)

(52) U.S. Cl.
CPC .......... *F16K 11/0876* (2013.01); *E21B 34/04* (2013.01); *Y10T 137/86638* (2015.04)

(58) Field of Classification Search
CPC ................. F16K 11/0876; E21B 34/04; Y10T 137/86638
See application file for complete search history.

(56) References Cited

U.S. PATENT DOCUMENTS 2,698,731 A   1/1955  Koehler et al.
3,118,650 A   1/1964  Cooper et al.
(Continued)

FOREIGN PATENT DOCUMENTS

EP           2 006 586 A2   12/2008

*Primary Examiner* — Kevin R Barss

(57) ABSTRACT

The present invention relates to a subsea control valve (10) for controlling the supply of hydraulic fluid to a subsea fluid-actuated device (4). The valve comprises a housing (11) with an input fluid line bore (16) connectable to a input fluid system (2), a return fluid line bore (17) connectable to a return fluid system (3) and an actuator fluid line bore (18) connectable to the fluid-actuated device (4). A ball valve member (20) with a through bore (21) is pivotably connected within the housing (11) between the input fluid line bore (16), the return fluid line bore (17) and the actuator fluid line bore (18), the ball valve member (20) having a first and a second position. The actuator fluid line bore (18) and the return fluid line bore (17) are connected to each other via the through bore (21) when the ball valve member (20) is in its first position, thereby allowing fluid to be returned from the fluid-actuated device (4) to the return fluid system (3). The input fluid line bore (16) and the actuator fluid line bore (18) are connected to each other via the through bore (21) when the ball valve member (20) is in its second position, thereby allowing fluid to flow from the input fluid system (2) to the fluid-actuated device (4).

26 Claims, 9 Drawing Sheets

(56) References Cited

U.S. PATENT DOCUMENTS

| | | | |
|---|---|---|---|
| 3,721,265 | A | 3/1973 | Hoffland |
| 4,552,334 | A | 11/1985 | Tomiyama et al. |
| 5,285,809 | A | 2/1994 | Shimoguri |
| 5,944,055 | A | 8/1999 | Dicky |
| 2001/0032951 | A1 | 10/2001 | Stewart |
| 2002/0096210 | A1 | 7/2002 | Schwarz et al. |
| 2005/0252560 | A1 | 11/2005 | Anderson et al. |
| 2014/0124195 | A1 | 5/2014 | Tahoun et al. |
| 2015/0226343 | A1 | 8/2015 | Jenks |

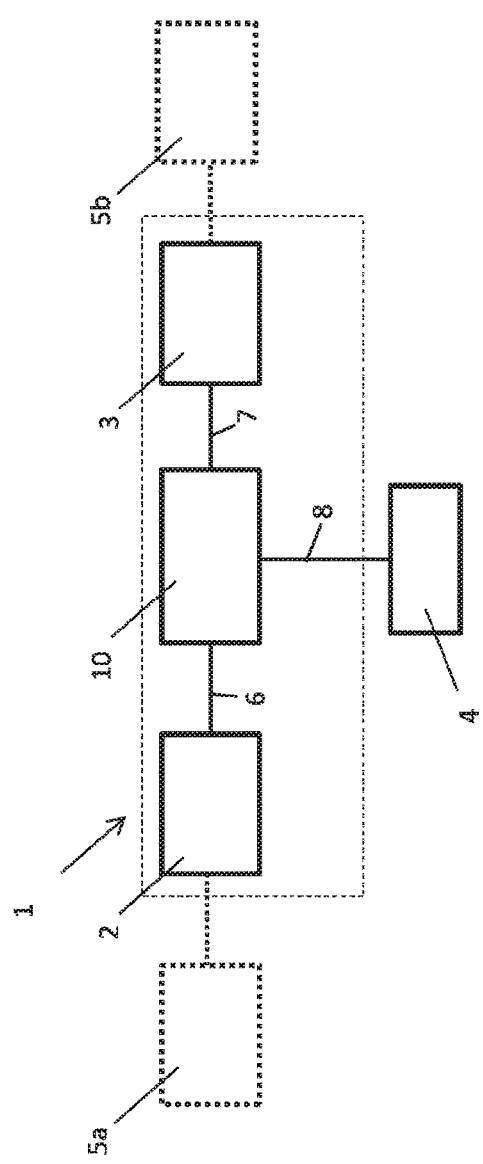
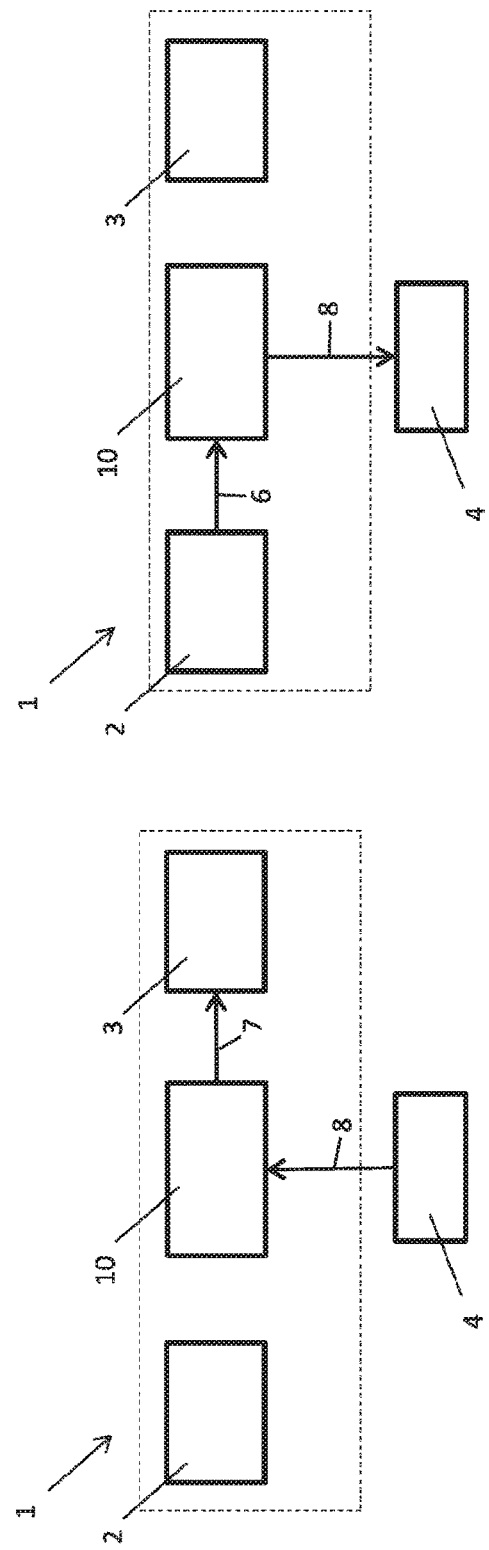

Fig. 10: Prior art

SUBSEA CONTROL VALVE

FIELD OF THE INVENTION

The present invention relates to a subsea control valve for controlling the supply of hydraulic fluid to a subsea actuator. The present invention also relates to a subsea control system for controlling a subsea fluid-actuated device between an initial state and an actuated state.

BACKGROUND OF THE INVENTION

The present invention relates to a subsea control valve, which is used to hydraulically control a subsea device. Such a subsea device may typically be a spring-biased valve where the valve is open when the spring force is counteracted by hydraulic fluid and where the valve is closed when the spring force is not counteracted.

There are several known subsea valves of the ball valve type having a housing with two or three fluid lines and a ball member with fluid passages, which upon rotation of the ball member in relation to the ball housing, provides connection between the different fluid lines. One example of a ball valve with three fluid lines is known from EP 2006586. Here, the ball member is oval or non-spherical to obtain that a sealing member for sealing between the ball member and the housing is exposed to a higher biasing force in the closed position than in the open position.

One object of the invention is to provide a reliable and yet simple subsea control valve. Another object is to reduce the size of subsea control equipment, such as the subsea control valve. These objects are parts of an overall object to decrease the size and weight of a subsea installation and hence to reduce time and costs involved with planning and installing the subsea installation.

SUMMARY OF THE INVENTION

The present invention relates to a subsea control valve for controlling the supply of hydraulic fluid to a subsea fluid-actuated device, comprising:
  a housing with an input fluid line, an output fluid line and an actuator fluid line;
  a ball valve member with a through bore, pivotably connected within the housing between the input fluid line, the output fluid line and the actuator fluid line, the ball valve member having a first and a second position;
where the actuator fluid line and the output fluid line are connected to each other via the through bore when the ball valve member is in its first position;
where the input fluid line and the actuator fluid line are connected to each other via the through bore when the ball valve member is in its second position.

The fluid lines are provided as bores through the different parts of the housing.

Fluid is supplied from the high pressure fluid line bore to the fluid-actuated device via the ball valve member and the actuator fluid line bore when the valve is in the second position. Hence, the high pressure fluid line bore is hereinafter referred to as an input fluid line bore. In second position, the ball valve member is closing the return fluid line.

Fluid is returned from the fluid actuated device to the low pressure fluid line bore via the ball valve member and the actuator fluid line bore when the ball valve member is in the first position. Hence, the low pressure fluid line bore is hereinafter referred to as a return fluid line bore. In this first position the ball valve member is closing the input fluid line.

Hence, the present invention relates to a subsea control valve for controlling the supply of hydraulic fluid to a subsea fluid-actuated device, comprising:
  a housing with an input fluid line bore connectable to a input fluid system, a return fluid line bore connectable to a return fluid system and an actuator fluid line bore connectable to the fluid-actuated device;
  a ball valve member with a through bore, pivotably connected within the housing between the input fluid line bore, the return fluid line bore and the actuator fluid line bore, the ball valve member having a first and a second position;
where the actuator fluid line bore and the return fluid line bore are connected to each other via the through bore when the ball valve member is in its first position, thereby allowing fluid to be returned from the fluid-actuated device to the return fluid system;
where the input fluid line bore and the actuator fluid line bore are connected to each other via the through bore when the ball valve member is in its second position, thereby allowing fluid to flow from the input fluid system to the fluid-actuated device.

In one aspect, the valve comprises an input side ball seat and a return side ball seat for supporting the ball valve member within the housing, where the input fluid line is provided through the input side ball seat and the return fluid line is provided through the return side ball seat.

In one aspect, the input side ball seat and the return side ball seat are biased towards the ball valve member. The ball seats may be biased in different manners by spring element and or by fluid pressure acting on surfaces or a combination. The fluid pressure may be the fluid pressure of a fluid flowing through the ball valve element or it may be a fluid pressure from another source.

In one aspect, a first ball valve seal is provided between the input side ball seat and the ball valve member and a second ball valve seal is provided between the return side ball seat and the ball valve member.

In one aspect, a radius of the first ball valve seal is smaller than a radius of the second ball valve seal. The radius of the first ball valve seal may also be equal to the radius of the second ball valve seal.

In one aspect, the valve comprises:
  an input side end element and a return side end element connected to the housing;
where an axially protruding section of the input side ball seat is sealed towards the input side end element by means of an input side seal;
where an axially protruding section of the return side ball seat is sealed towards the return side end element by means of a return side seal. The input fluid line and return fluid line runs through the input side end element and return side end element respectively. These end elements also comprise sealing elements between them and the housing. The bores of the end elements and the ball seats are formed with a mainly common cross section, similar also to cross section of the bores of the valve element.

In one aspect, the input side ball seat comprises an input side inner piston surface exposed to the fluid pressure of the input fluid line and an input side outer piston surface exposed to the fluid pressure of the actuator fluid line; and where the return side ball seat comprises a return side inner piston surface exposed to the fluid pressure of the return fluid line and a return side outer piston surface exposed to the fluid pressure of the actuator fluid line. The actuator fluid will then act on the piston surface and thereby press the ball seats towards the ball element, and this force will dependent on if the actuator fluid line is connected to the input fluid line or the return fluid line.

In one aspect, an input side spring device and a return side spring device are provided between the respective ball seats and end elements. This spring device will also assist in pressing the ball seat against the ball element. These spring devices may be similar on the two sides or they may be of different strength in biasing the ball seat against the ball valve element.

In one aspect, a rotation axis of the ball valve member is perpendicular to a longitudinal axis of the input fluid line and a longitudinal axis of the return fluid line. A longitudinal axis of the actuator fluid line may be aligned with or coinciding with the rotation axis of the ball valve member. The fluid line axis of the input and return fluid lines may be arranged in a common plane mainly perpendicular to the rotation axis and possibly also to the actuator fluid line. The input fluid line axis and the return fluid line axis may be aligned, hence be arranged at opposite sides of the ball valve element.

In one aspect, the ball valve member comprises a shaft protruding out from an opening of the housing for rotation of the ball valve member in relation to the housing, where a shaft seal is provided between the shaft and the opening of the housing.

In one aspect, the ball valve member comprises a supporting element protruding into the actuator fluid line bore of the housing. This will assist stabilizing the ball valve element during rotation, as the ball valve element thereby have contact points on both sides of the ball valve element during rotation, hence the shaft and the supporting element.

In one aspect, the through bore of the ball valve member comprises a first segment perpendicular to the rotation axis and a second segment coinciding with the rotation axis. The bore hence turns the flow through the ball valve element 90 degrees from the input to the actuator and from the actuator to the return in the two positions.

In a second aspect, the through bore comprises a third segment also arranged perpendicular to the rotation axis, giving two bore segments from the outer side of the ball valve element and into the center of the ball valve element, which both are perpendicular to the rotation axis and where both bore segments are connected to the bore segment coinciding with the rotation axis. These two bore segments may also be arranged perpendicular to each other, so that when the input line bore and the return bore are aligned a 90 degree turn of the ball valve will connect either the input line bore to the actuator bore or the return line to the actuator bore. It is possible to envisage other angles between these two bore segments in the ball valve element.

The shaft and the ball valve member may be provided as one body, or as several assembled bodies. In one aspect, the valve member is connected to the shaft by means of a connection interface allowing the valve member to be rotated by the shaft, but where the connection interface comprises a piston surface exposed to the fluid of the actuator fluid line. In one aspect, the through bore of the ball valve member comprises a fluid bore section extending towards the piston surface.

In one aspect, the area of the input side inner piston surface is larger than the area of the return side inner piston surface.

In one aspect, the area of the input side outer piston surface is smaller than the area of the return side outer piston surface.

The present invention also relates to a system for controlling a subsea fluid-actuated device between an initial state and an actuated state, the device comprising an actuator member biased with a biasing force to the initial state; where the system comprises:
  a subsea control valve comprising a ball valve member, an input fluid bore, a return fluid bore and an actuator fluid bore,
  an input fluid system connected to the input fluid bore, where the fluid pressure of the input fluid system is configured to be higher than the pressure needed to counteract the biasing force of the actuator member;
  a return fluid system connected to the return fluid bore, where the fluid pressure of the return fluid system is configured to be lower than the pressure needed to counteract the biasing force of the actuator member;
where the actuator fluid line bore of the valve is connectable to the fluid-actuated device;
where the actuator fluid line bore and the return fluid line bore are connected to each other when a ball valve member is in its first position; thereby allowing fluid to return from the actuator fluid line bore to the return fluid bore;
where the input fluid line bore and the actuator fluid line bore are connected to each other when the ball valve member is in its second position, thereby allowing fluid to flow from the input fluid system to the actuator fluid line bore.

In relation to the use of high pressure source and low pressure source, these are in this application not set at specific levels, rather that the high pressure source is a source with a pressure higher than the low pressure source, and the low pressure source may for instance be a subsea return line. Hence the high pressure source in this invention may be a source generally denoted as low pressure source for the subsea system as a whole, where the subsea system as a whole normally would have a high pressure source and a low pressure source of hydraulics and a return line for hydraulics.

In one aspect, the subsea control system comprises:
  a stepper motor connected to the valve shaft;
  a motor controller for controlling the stepper motor;
  a sensor device connected to the motor controller for determining the orientation of the shaft.

The details of one or more embodiments of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

Embodiments of the invention will now be described in detail with respect to the enclosed drawings, where:

FIG. 1 illustrates schematically a system for controlling a subsea fluid-actuated device;

FIG. 2 illustrates the fluid flow in the system of FIG. 1 in the initial state;

FIG. 3 illustrates the fluid flow in the system of FIG. 1 in the actuated;

DETAILED DESCRIPTION

Figure 4:
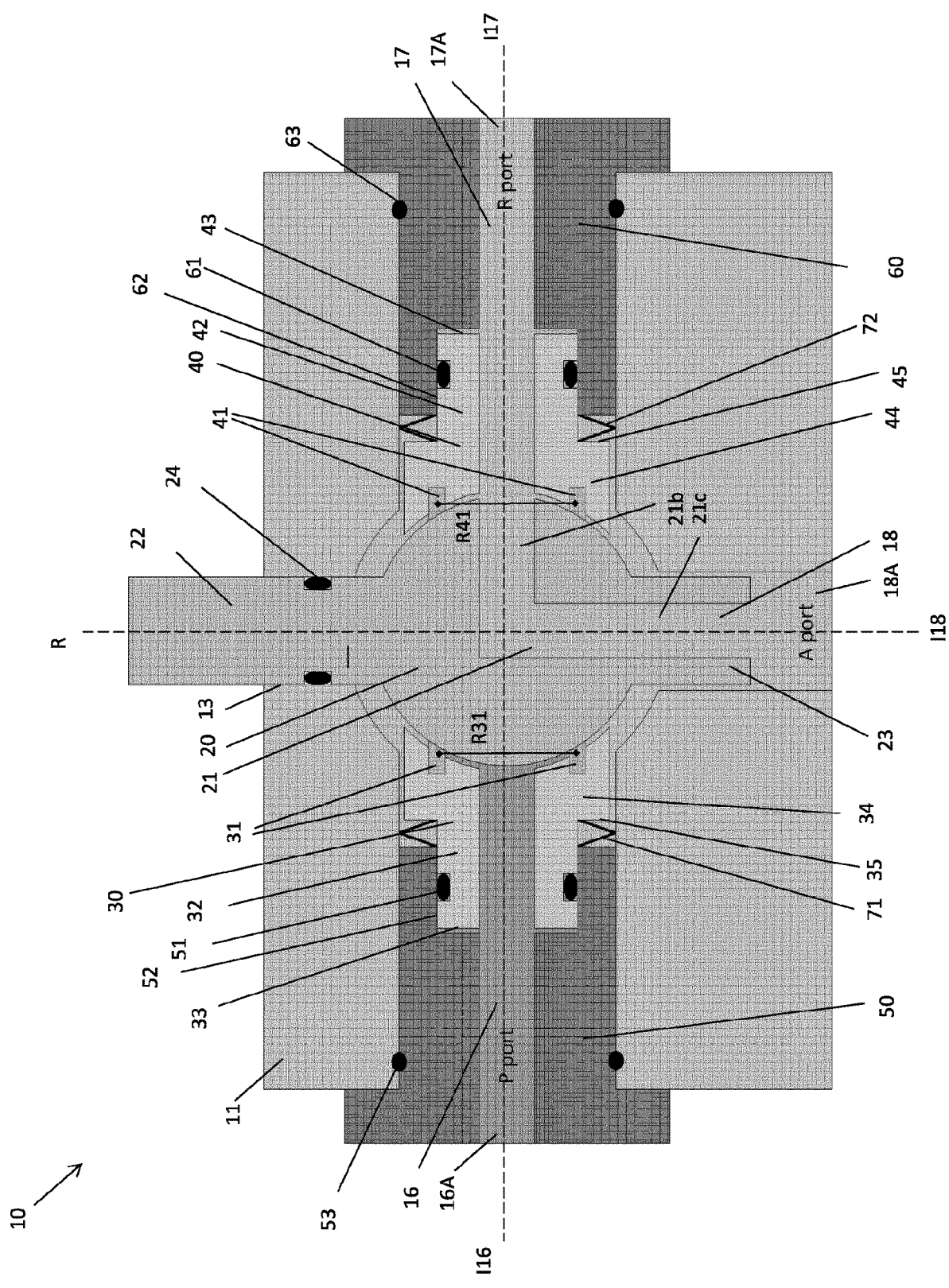
FIG. 4 illustrates a cross sectional side view of a first embodiment of a subsea control valve for controlling the supply of hydraulic fluid to a subsea actuator in the first position.

Reference is now made to FIGS. 1-3 and 10. In FIG. 1, a system 1 for controlling a subsea fluid-actuated device 4 is shown. The system 1 is indicated with a dashed box. The system 1 comprises an input fluid system 2, a return fluid system 3 and a subsea control valve 10 connected to the input fluid system 2 via a first fluid line 6 and to the return fluid system 3 via second fluid line 7.

The system 1 is connectable to the fluid-actuated device 4, to an input fluid source indicated with a dotted box 5a and to a return fluid reservoir/line to the surface indicated with a dotted box 5b. Hence, the fluid-actuated device 4, the input fluid source 5a and the return fluid reservoir 5b are not considered to be a part of the system 1.

In FIG. 1, the valve device 10 has been connected to the fluid actuated device 4 via a third fluid line 8. The input fluid system 2 has been connected to the input fluid source 5a and the return fluid system 3 has been connected to the fluid reservoir 5b.

The input fluid system 2 comprises fluid bores, valves etc for supplying fluid from the input fluid source 5a to the valve 10. The system 2 may comprise selector valves for selecting to supply fluid to the valve 10 from one of several possible sources, for example for redundancy purposes. The fluid source 5a may be located topside (connected to the system 1 via an umbilical) or it may be located on the seabed.

In the same way, the system 3 may comprise similar safety valves etc. The return fluid reservoir 5b may be a fluid reservoir located topside (again connected to the system 1 via the umbilical) or on the seabed. The return fluid reservoir 5b may also be a fluid line which are feed back to the input fluid source 5a via a pump etc. for increasing the fluid pressure to the fluid pressure of the input fluid line. If the fluid is considered environmentally friendly, the return fluid may also be dumped to sea.

The input fluid system 2, the return fluid system 3, the input fluid source 5a and the return fluid reservoir 5b are considered known for the skilled person and will not be described herein further in detail.

The system 1 is used to control a subsea fluid-actuated device 4, for example a subsea actuator, which for instance may open and close a valve.

Figure 10:
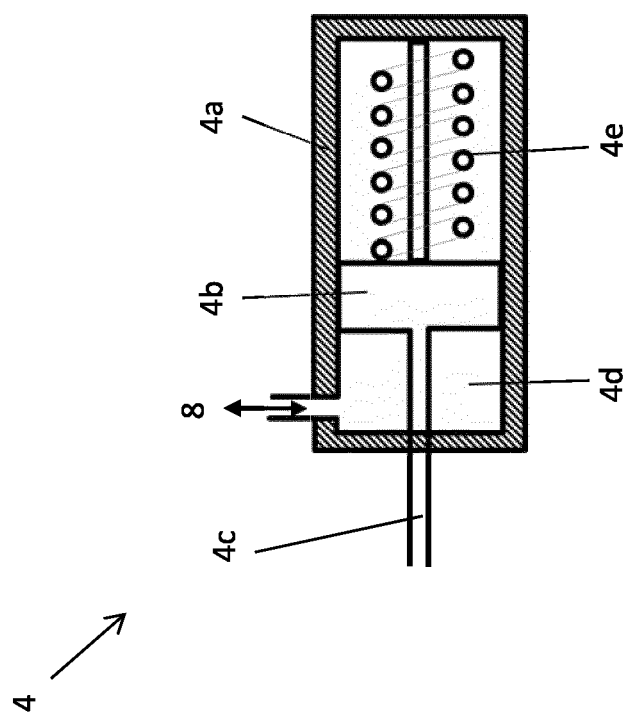
FIG. 10 illustrates one example of a subsea fluid-actuated device being controlled by the system of FIG. 1.

One embodiment of the device 4 will now be described with reference to FIG. 10. The device 4 is here a subsea actuator, for example an actuator for moving a subsea valve (not shown) between its open and closed states, typically by means of a linear movement. The device 4 is shown to comprise a housing 4a with a reciprocating piston 4b provided within the housing 4a. An actuator rod 4c is provided through the housing 4a and is connected to the piston 4b. Together, the actuator rod and actuator piston forms an actuator member. On a first side of the piston, a fluid chamber 4d is provided. On the second side, opposite of the first side, a spring member 4e is provided. The fluid chamber 4d would be connected to the above third fluid line 8. For safety reasons, most safety critical subsea valves, as the main valves closing down the well, are configured to be in its closed state if the fluid pressure in the chamber 4d is low, for example due to a fluid leakage, an error in the control system etc. Hence, the spring member 4e is biased to keep the valve in this closed or initial state. However, if fluid with a sufficient fluid pressure is supplied to the fluid chamber 4d, the force provided by the spring member 4e will be counteracted, thereby causing the actuator member of the device 4 to move the valve to its open state.

It should be noted that the device 4 is regarded as well known for a skilled person. The present subsea control system 1 may be used to control not only valves (such as downhole valves, valves in Christmas trees etc), but also other subsea equipment such as chokes, etc.

In FIG. 2, the ball valve 10 is in a first position, in which the fluid chamber 4d of the device 4 is connected via fluid lines 8 and 7 to the return fluid system 3. Here, the fluid pressure is too low to counteract the biasing force of the spring member 4e, causing the device 4 to be in its initial or non-actuated state.

In FIG. 3, the ball valve 10 is in a second position, in which the fluid chamber 4d of the device 4 is connected via fluid lines 8 and 6 to the input fluid system 2. Here, the fluid pressure is sufficiently high to counteract the biasing force of the spring member 4e, causing the device 4 to be in its actuated state.

It should be noted that when the ball valve 10 is going from the non-actuated state to the actuated state, at least some of the fluid inside the fluid chamber 4d will be pressed out from the chamber 4d by means of the spring member 4e into the return fluid system 3 via fluid line 8 and the ball valve 10.

Figure 5:
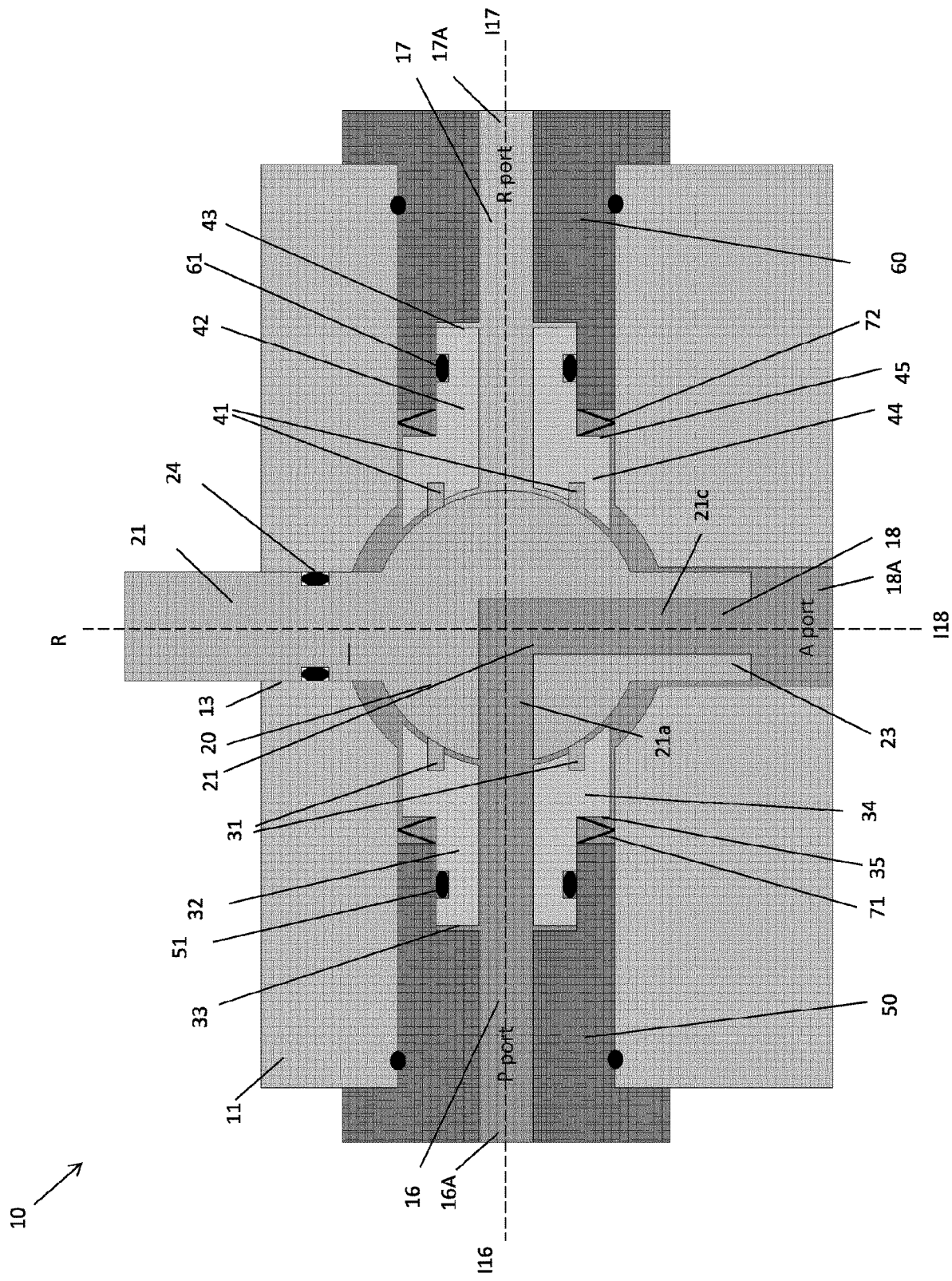
FIG. 5 illustrates the subsea control valve of FIG. 4 in the second position.

Reference is now made to FIGS. 4 and 5, where a first embodiment of the subsea control valve 10 is shown. As described above, the purpose of the control valve 10 is to control the supply of hydraulic fluid to the device 4. It should be noted that the direction of the fluid flow between systems 2, 3 and the device 4 are controlled by the position of the ball valve due to the pressure differences between the fluid in the system 2 and 3 and due to the fluid pressure required to counteract the biasing force of the spring 4e.

As mentioned above, the fluid-actuated device 4 is biased with a biasing force to an initial state. The fluid pressure of the input fluid system 2 is higher than the pressure needed to counteract the biasing force while the fluid pressure of the return fluid system 3 is lower than the pressure needed to counteract the biasing force.

The control valve 10 comprises a housing 11 with an input fluid line bore 16, a return fluid line bore 17 and an actuator fluid line bore 18. Each fluid line bore 16, 17, 18 may be provided with respective fluid line connectors at the indicated positions 16A, 17A, 18A for connection to the fluid lines 6, 7, 8 of FIG. 1.

In the drawings, the longitudinal axis of the fluid line bores 16, 17, 18 are indicated as dashed lines l16, l17, l18. The axis l16 and l17 are provided in the same plane. The axis l16 and l17 are aligned with each other as shown in FIGS. 4 and 5. In the embodiment shown in FIGS. 4 and 5, the axis l18 is perpendicular to the axis l16 and l17.

As shown in the drawings the axis l16 and l17 are aligned and within a common plane, however it is possible to envisage the axis not being aligned but still being in a common plane perpendicular to the l18.

The control valve 10 further comprises a ball valve member 20 with a through bore 21, pivotably connected within the housing 11 between the input fluid line bore 16, the return fluid line bore 17 and the actuator fluid line bore 18. The ball valve member 20 comprises a shaft 22 protruding out from an opening 13 of the housing 11. The shaft 22 is used to rotate the ball valve member 20 in relation to the housing 11, for example by means of a motor. This will be described in detail further below.

A shaft seal 24 is provided between the shaft 22 and the opening 13 of the housing 11. This shaft seal 24 may for example be an O-ring or other suitable type of seal.

The ball valve member 20 may also comprise a supporting element 23 protruding into the actuator fluid line bore 18 of the housing 11. The supporting element 23 may rotate together with the ball valve member 20 during rotation of the ball valve member 20. As shown in FIG. 4, the bore 21 is provided through the supporting element 23. The supporting element 23 is formed as a part of the ball valve member 20, and is arranged at the opposite side of the ball valve member in comparison with the shaft 22. Hence when the shaft is rotated the support member 23 provide a stabilizing element at the opposite side of the ball valve member.

A rotation axis of the shaft 21 and hence of the ball valve member 20 is indicated by a dashed line R in FIGS. 4-7. In the present embodiment, the longitudinal axis I18 of the actuator fluid line bore 18 is aligned with the rotation axis R of the ball valve member 20. Accordingly, the fluid line axis I16, I17 are also perpendicular to the rotation axis R.

The control valve 10 comprises an input side ball seat 30 and a return side ball seat 40 for supporting the ball valve member 20 and sealing elements within the housing 11. The input side ball seat 30 is provided on the same side as the input fluid line bore 16, and the input fluid line bore 16 is provided as a bore through the input side ball seat 30. The return side ball seat 40 is provided on the same side as the return fluid line bore 17, and the return fluid line bore 17 is provided as a bore through the return side ball seat 40.

The control valve 10 further comprises an input side end element 50 and a return side end element 60 connected to the housing 11. The end elements 50, 60 may be connected to the housing 11 for example by means of threads, welding etc. Sealing elements 53, 63 are provided between the respective end elements 50, 60 and the housing 11. The input fluid line bore 16 is provided as a bore through the input side end element 50 and the return fluid line bore 17 is provided as a bore through the return side end element 60. The input side end element 50 and input side ball seat 30 with their bores then form fluid lines of mainly constant cross sections from the connection point into the ball valve element.

The end elements 50, 60, together with the housing 11, are supporting the ball seats 30, 40. In FIG. 4, it is shown that the input side ball seat 30 comprises an axially protruding section 32, protruding in the direction towards the input fluid line port 16A. The input side end element 50 comprises an opening 52 for receiving the axially protruding section 32. An input side seal 51 is provided between the axially protruding section 32 and the opening 52. The return side ball seat 40 comprises an axially protruding section 42, protruding in the direction towards the return fluid line port 17A. The return side end element 60 comprises an opening 62 for receiving the axially protruding section 42. A return side seal 61 is provided between the axially protruding section 32 and the opening 52.

An inner annular piston surface 33 is provided in the end of the axially protruding section 32 of the input side ball seat 30, facing towards the input side end element 50. The input side ball seat 30 also comprises an outer annular piston surface 35 facing towards the input side end element 50.

In the same way, an inner annular piston surface 43 is provided in the end of the axially protruding section 42 of the return side ball seat 40, facing towards the return side end element 60. The return side ball seat 40 also comprises an outer annular piston surface 45 facing towards the return side end element 60.

The terms "inner" and "outer" here refers to the axis I16 and I17, where the inner piston surfaces 33, 43 are closer to the axis I16 and I17 than the outer piston surfaces 35, 45.

The input side ball seat 30 and the return side ball seat 40 are biased towards the ball valve member 20 by means of respective spring devices 71, 72. The input side spring device 71 is provided between the outer annular piston surface 35 of the input side ball seat 30 and the input side end element 50. The return side spring device 72 is provided between the outer annular piston surface 45 of the return side ball seat 40 and the return side end element 60.

A first ball valve seal 31 is provided between the input side ball seat 30 and the ball valve member 20 and a second ball valve seal 41 is provided between the return side ball seat 40 and the ball valve member 20. The first ball valve seal 31 is preferably a substantially ring-shaped sealing element having a radius R31. The second ball valve seal 41 is preferably a substantially ring-shaped sealing element having a radius R41.

It should be noted that the fluid in the input fluid line bore 16 is acting on the inner annular piston surface 33 of the ball seat 30 and that the fluid in the return fluid line bore 17 is acting on the inner annular pistons surface 43 of the ball seat 40. Moreover, the fluid in the actuator fluid line bore 18 is acting on both of the outer piston surfaces 35, 45 of the ball seats 30, 40.

In FIG. 4, the first position of the ball valve member 20 is shown. Here, the actuator fluid line bore 18 and the return fluid line bore 17 are connected to each other via the through bore 21. After the ball valve member 20 has been rotated to this position; the fluid pressure in the actuator fluid line bore 18 will be equal to the fluid pressure in the return fluid line bore 17. Both of the outer annular piston surfaces 35, 45 and the inner annular piston surface 43 will be exposed to the same fluid pressure.

In FIG. 5, the second position of the ball valve member 20 is shown. Here, the input fluid line bore 16 and the actuator fluid line bore 18 are connected to each other via the through bore 21. A while after the ball valve member 20 has been rotated to this position; the fluid pressure in the actuator fluid line bore 18 will be equal to the fluid pressure in the input fluid line bore 16. Both of the outer annular piston surfaces 35, 45 and the inner annular piston surface 33 will be exposed to the same fluid pressure.

In FIGS. 4 and 5, the radius R31 of the first ball valve seal 31 is equal to the radius R41 of the second ball valve seal 41. Moreover, the area of the outer annular piston surface 35 is equal to the area of the outer annular piston surface 45 and the area of the inner annular piston surface 33 is equal to the area of the inner annular piston surface 43.

Figure 8:
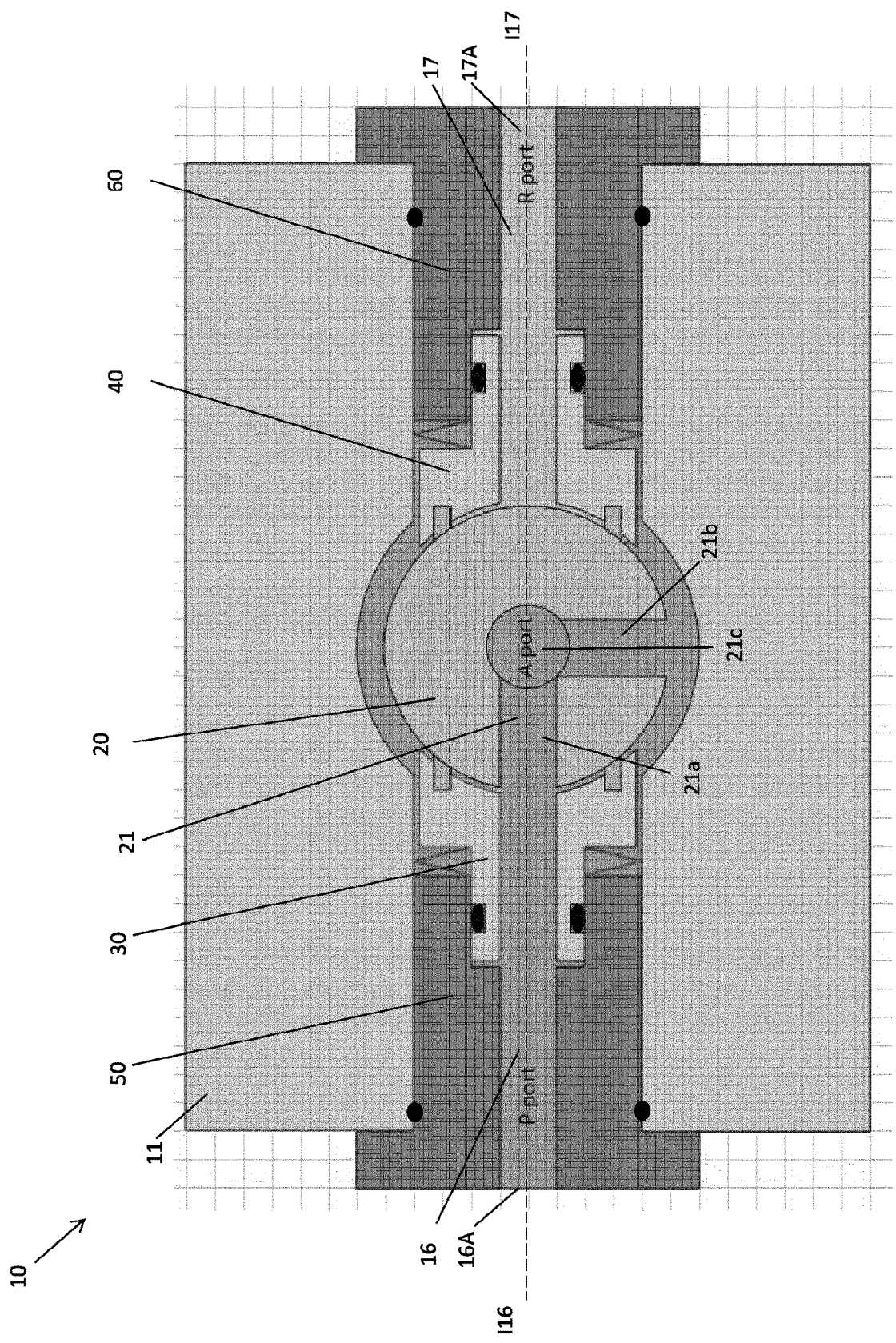
FIG. 8 illustrates a cross sectional top view of the first embodiment.

Reference is now made to FIG. 8, showing a top view of the control valve of FIG. 5 (i.e. in its second position). Here it is shown that the bore 21 provided in the ball valve member 20 comprises a first bore section 21a and a second bore section 21b provided perpendicular to the first bore section 21a. In addition, the bore 21 comprises a third bore section 21c which is provided centrally downwards to the actuator fluid line bore 18, i.e. perpendicular to both the first and second bore sections 21a, 21b. The bore sections 21b and 21c are also shown in FIG. 4 and the bore sections 21a and 21c are also shown in FIG. 5. The third bore section 21c is provided through the supporting element 23 of the ball valve member 20.

In an alternative embodiment, the ball valve member may have only one bore section 21a which is to be provided in fluid communication with the input fluid line bore 16 in the first state and the return fluid line bore 17 in second state, while the bore section 21c is always provided in fluid communication with the actuator fluid line bore 18. In such an embodiment, a rotation of 180° of the ball valve member 20 is necessary to move the control valve 10 between its first and second position, when the input fluid line bore and return fluid line bore are aligned at opposite sides of the ball valve member. It is possible to envisage the input fluid line bore and the return fluid line bore at 90 degrees with each other or another angle but in the same plane, and then the rotation of the ball valve will not necessary need 180 degrees but rather 90 degrees or another other angle.

As mentioned above, the axis I16 and I17 of the bores 16, 17 are coinciding with each other, as shown in FIGS. 4, 5 and 8. However, it is also possible that the axis I16 and I17 of the bores 16, 17 are not coinciding, they may for example be oriented with an angle of for example 10°-170° with respect to each other (depending of course of the desired diameter of the bores 16, 17 and the diameter of the ball member).

Figure 6:
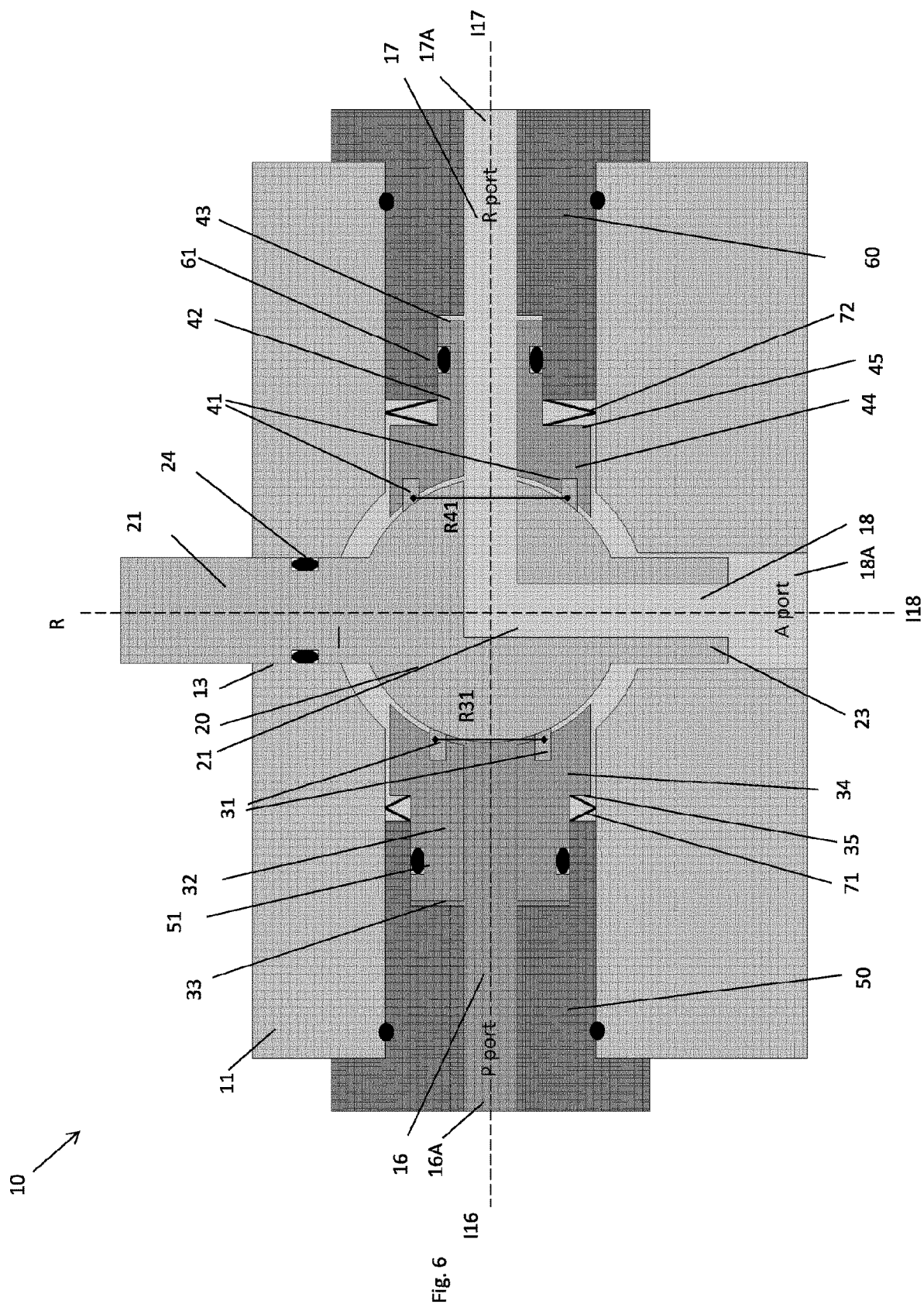
FIG. 6 illustrates a cross sectional side view of an alternative embodiment of the valve in the first position.
Figure 7:
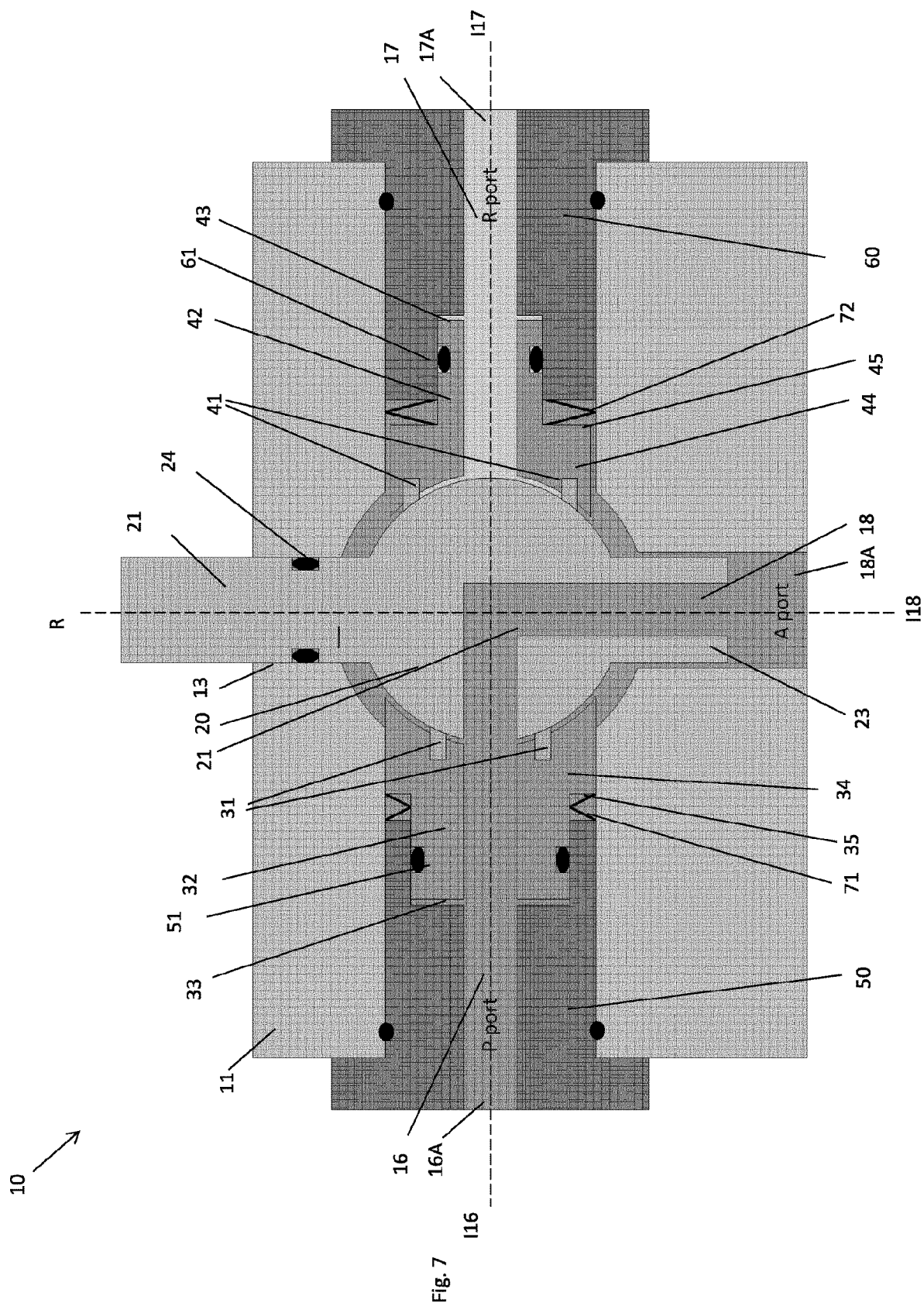
FIG. 7 illustrates the alternative embodiment of the valve of FIG. 6 in the second position.

Reference is now made to FIGS. 6 and 7. The control valve of FIGS. 6 and 7 is substantially equal to the control valve of FIGS. 4 and 5. Hence, only the differences will be described below.

In FIGS. 6 and 7, the radius R31 of the first ball valve seal 31 is smaller than the radius R41 of the second ball valve seal 41. Moreover, the area of the input side inner annular piston surface 33 is larger than the area of the return side inner annular piston surface 43. Moreover, the area of the input side outer annular piston surface 35 is smaller than the area of the return side outer annular piston surface 45. Accordingly, it is achieved that the fluid pressure, or the difference in fluid pressure, is assisting in the sealing of the control valve by pushing the ball seats 30, 40 towards the ball valve member 20. The areas of the piston surfaces and the areas within the seals 31, 41 are different due to the differences in fluid pressure in the input fluid line bore 16 and the return fluid line bore 17.

Figure 9:
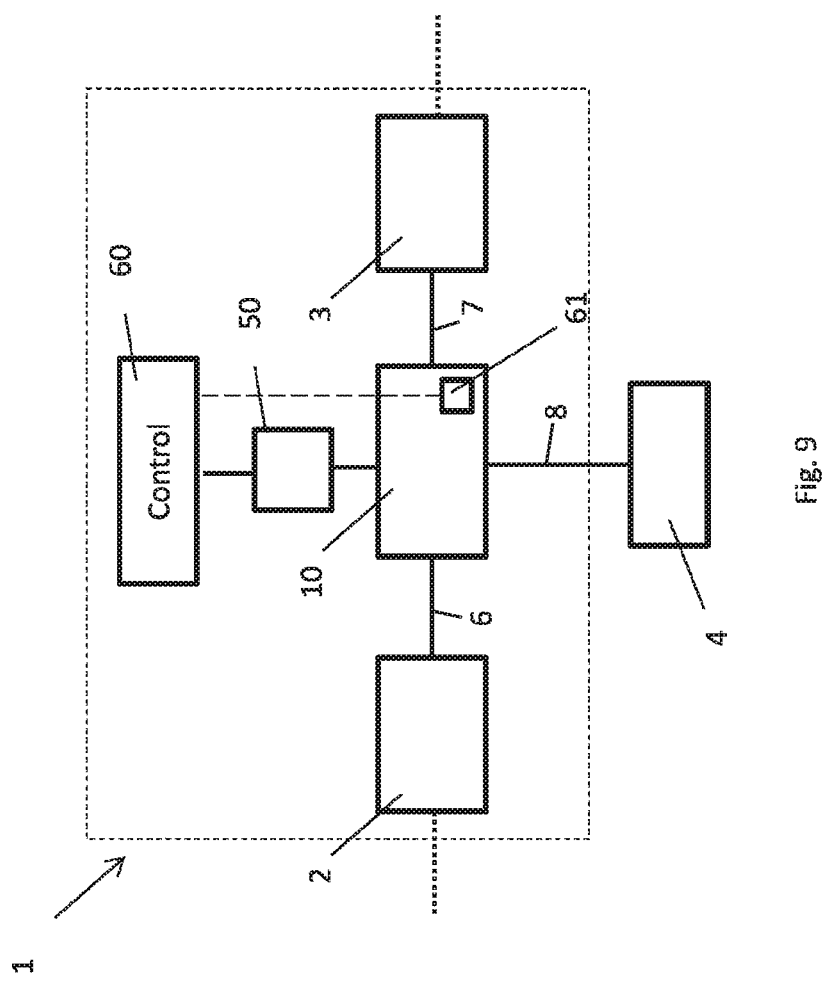
FIG. 9 illustrates the control system of the subsea control valve.

Reference is now made to FIG. 9, which shows many of the same features as FIG. 1. In addition, FIG. 9 shows a stepper motor 50 having its rotor connected to the valve shaft 22 of the control valve 10, and a motor controller 60 for controlling the stepper motor 50. The motor controller is connected to a power source and is controlling the electric power (voltage/current) supplied to the motor 50 by means of a control circuit, for example a digital signal processor. The stepper motor 50 does not itself give an accurate feedback with respect to the position of its rotor, hence a sensor device 61 is connected to the motor controller for determining the orientation of the shaft 22. The sensor device 61 may be integrated in the motor controller itself, for example by means of a current sensor measuring the back-emf of the current supplied to the motor. Alternatively, the sensor device 61 may comprise one or more position sensors connected to the housing 11 and/or the shaft 22.

Figure 11:
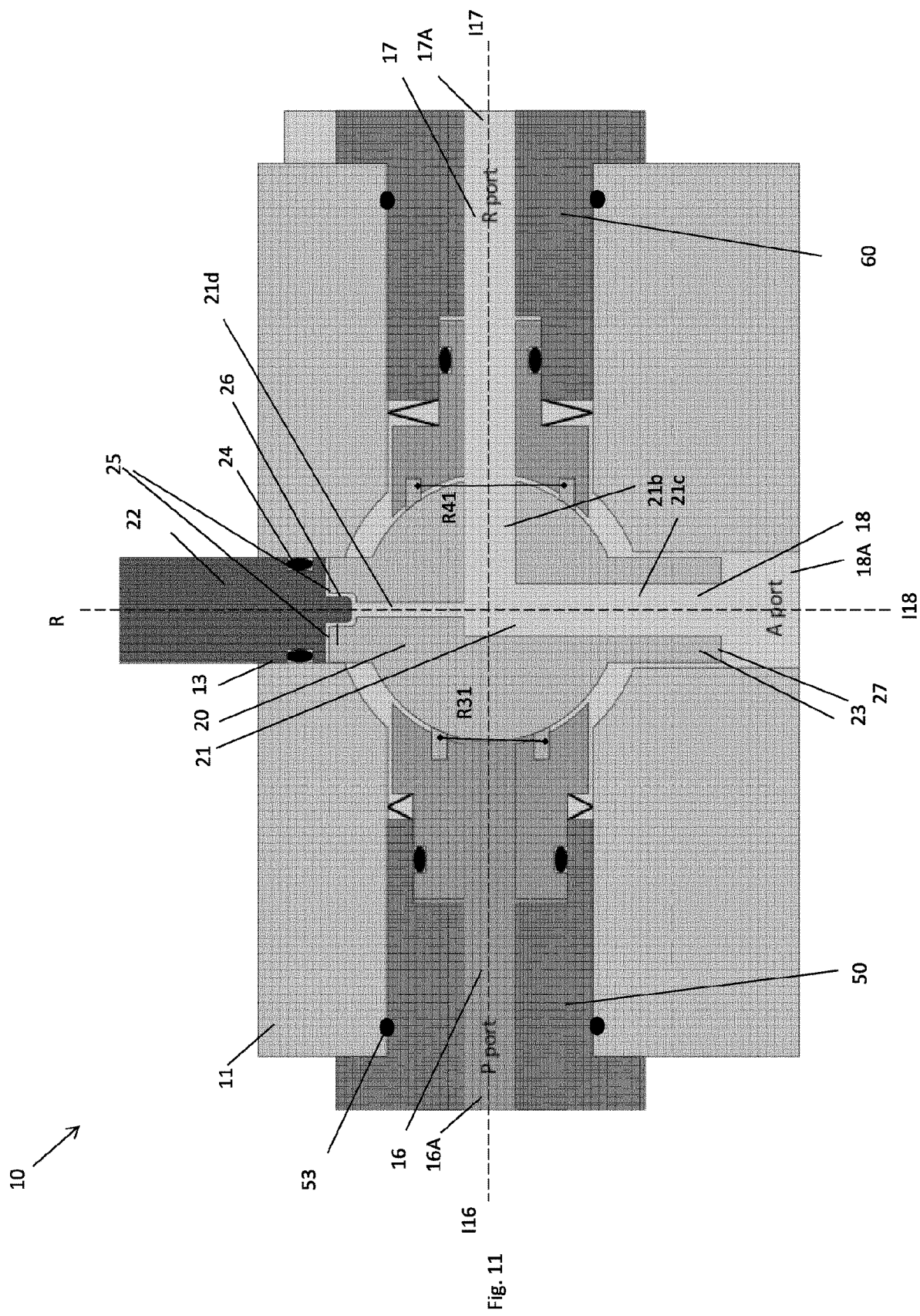
FIG. 11 illustrates an alternative embodiment of the invention.

Reference is now made to FIG. 11, showing an alternative embodiment to FIG. 6. Only the differences will be described here. In FIG. 6, the ball valve member 20 and the shaft 22 are made as one body, alternatively as two bodies fixed to each other.

In FIG. 11, the ball valve member 20 is connected to the shaft 22 by means of a connection interface 26 allowing the valve member 20 to be rotated by the shaft 22. Here, the connection interface 26 comprises a piston surface 25 exposed to the fluid of the actuator fluid line bore 18. The piston surface 25 and a piston surface 27 of the supporting element 23 being exposed to the fluid of the actuator fluid line bore 18 are provided on opposite sides of the ball valve member 20.

Alternatively, a fourth fluid bore section 21d with a smaller radius than the other bores in the ball valve element, may be provided as an extension of the fluid bore section 21c along the axis 18A towards the shaft 22. The fourth fluid flow bore section 21d will contribute to easier or quicker fluid pressure alignment between the side of the ball valve member 20 being adjacent to the shaft 22 and the side of the ball valve member 20 being adjacent to the port 18A. This forth fluid bore section 21d is not necessary as the fluid pressure from the actuator port 18A will be transmitted to the piston surface 25 through the cavity in the housing along the ball valve element anyhow. As indicated in FIG. 11, there is a small gap between the shaft 22 and the ball valve member 20, forming the piston surface 25.

The invention claimed is:

1. A subsea control valve for controlling the supply of hydraulic fluid to a subsea fluid-actuated device, the subsea control valve comprising:
   a housing comprising an input fluid line bore connectable to a input fluid system, a return fluid line bore connectable to a return fluid system and an actuator fluid line bore connectable to the fluid-actuated device; and
   a ball valve member comprising a through bore, the ball valve member being pivotably connected within the housing between the input fluid line bore, the return fluid line bore and the actuator fluid line bore and having a first and a second position;
   wherein the actuator fluid line bore and the return fluid line bore are connected to each other via the through bore when the ball valve member is in its first position, thereby allowing fluid to be returned from the fluid-actuated device to the return fluid system; and
   wherein the input fluid line bore and the actuator fluid line bore are connected to each other via the through bore when the ball valve member is in its second position, thereby allowing fluid to flow from the input fluid system to the fluid-actuated device;
   an input side ball seat and a return side ball seat for supporting the ball valve member within the housing, wherein the input fluid line bore is provided through the input side ball seat and the return fluid line bore is provided through the return side ball seat;
   a first ball valve seal having a first radius, the first ball valve seal being provided between the input side ball seat and the ball valve member; and
   a second ball valve seal having a second radius, the second ball valve seal being provided between the return side ball seat and the ball valve member;
   wherein the first radius of the first ball valve seal is smaller than the second radius of the second ball valve seal.

2. The subsea control valve according to claim 1, where the input side ball seat and the return side ball seat are biased towards the ball valve member.

3. The subsea control valve according to claim 1, further comprising:
   an input side end element and a return side end element which are both connected to the housing;

wherein an axially protruding section of the input side ball seat is sealed against the input side end element by an input side seal; and wherein an axially protruding section of the return side ball seat is sealed against the return side end element by a return side seal.

4. The subsea control valve according to claim 3, wherein an input side spring device is provided between the input side ball seat and the input side end element and a return side spring device is provided between the return side ball seat and the return side end element.

5. The subsea control valve according to claim 3, wherein the input side ball seat comprises an input side inner piston surface which is exposed to the fluid pressure of the input fluid line and an input side outer piston surface which is exposed to the fluid pressure of the actuator fluid line, and wherein the return side ball seat comprises a return side inner piston surface which is exposed to the fluid pressure of the return fluid line and a return side outer piston surface which is exposed to the fluid pressure of the actuator fluid line.

6. The subsea control valve according to claim 5, wherein an area of the input side inner piston surface is larger than an area of the return side inner piston surface.

7. The subsea control valve according to claim 5, wherein an area of the input side outer piston surface is smaller than an area of the return side outer piston surface.

8. The subsea control valve according to claim 1, wherein a rotation axis of the ball valve member is perpendicular to a longitudinal axis of the input fluid line bore and a longitudinal axis of the return fluid line bore.

9. The subsea control valve according to claim 1, wherein a longitudinal axis of the actuator fluid line bore coincides with a rotation axis of the ball valve member.

10. The subsea control valve according to claim 1, wherein the ball valve member comprises a supporting element protruding into the actuator fluid line bore of the housing.

11. The subsea control valve according to claim 1, wherein the ball valve member is connected to a shaft by a connection interface which allows the valve member to be rotated by the shaft, and wherein the connection interface comprises a piston surface which is exposed to the fluid of the actuator fluid line.

12. The subsea control valve according to claim 11, wherein the through bore of the ball valve member comprises a fluid bore section which extends towards the piston surface.

13. The subsea control valve according to claim 1, wherein the through bore of the ball valve member comprises two sections which are oriented at an angle of 90° in relation to each other, wherein one section is perpendicular to a rotation axis of the ball valve member and another section coincides with the rotation axis of the ball valve member.

14. A system for controlling operation of a subsea fluid-actuated device between an initial state and an actuated state, the device comprising an actuator member which is biased with a biasing force to the initial state; wherein the system comprises:
a subsea control valve comprising a ball valve member, an input fluid line bore, a return fluid line bore and an actuator fluid line bore;
an input fluid system connected to the input fluid line bore, wherein a fluid pressure of the input fluid system is configured to be higher than a pressure needed to counteract the biasing force of the actuator member;
a return fluid system connected to the return fluid line bore, wherein a fluid pressure of the return fluid system is configured to be lower than the pressure needed to counteract the biasing force of the actuator member;
wherein the actuator fluid line bore is connectable to the fluid-actuated device;
wherein the actuator fluid line bore and the return fluid line bore are connected to each other when the ball valve member is in a first position, thereby allowing fluid to return from the actuator fluid line bore to the return fluid bore; and
wherein the input fluid line bore and the actuator fluid line bore are connected to each other when the ball valve member is in a second position, thereby allowing fluid to flow from the input fluid system to the actuator fluid line bore; and
wherein the subsea control valve further comprises:
a housing;
an input side ball seat and a return side ball seat for supporting the ball valve member within the housing, wherein the input fluid line bore is provided through the input side ball seat and the return fluid line is provided through the return side ball seat;
a first ball valve seal having a first radius, the first ball valve seal being provided between the input side ball seat and the ball valve member; and
a second ball valve seal having a second radius, the second ball valve seal being provided between the return side ball seat and the ball valve member;
wherein the first radius of the first ball valve seal is smaller than the second radius of the second ball valve seal.

15. The system according to claim 14, where the input side ball seat and the return side ball seat are biased towards the ball valve member.

16. The system according to claim 14, wherein the subsea control valve further comprises:
an input side end element and a return side end element which are both connected to the housing;
wherein an axially protruding section of the input side ball seat is sealed against the input side end element by an input side seal; and
wherein an axially protruding section of the return side ball seat is sealed against the return side end element by a return side seal.

17. The system according to claim 16, wherein an input side spring device is provided between the input side ball seat and the input side end element and a return side spring device is provided between the return side ball seat and the return side end element.

18. The system according to claim 16, wherein the input side ball seat comprises an input side inner piston surface which is exposed to the fluid pressure of the input fluid line and an input side outer piston surface which is exposed to the fluid pressure of the actuator fluid line, and wherein the return side ball seat comprises a return side inner piston surface which is exposed to the fluid pressure of the return fluid line and a return side outer piston surface which is exposed to the fluid pressure of the actuator fluid line.

19. The system according to claim 18, wherein an area of the input side inner piston surface is larger than an area of the return side inner piston surface.

20. The system according to claim 18, wherein an area of the input side outer piston surface is smaller than an area of the return side outer piston surface.

21. The system according to claim 14, wherein a rotation axis of the ball valve member is perpendicular to a longitudinal axis of the input fluid line bore and a longitudinal axis of the return fluid line bore.

22. The system according to claim 14, wherein a longitudinal axis of the actuator fluid line bore coincides with a rotation axis of the ball valve member.

23. The system according to claim 14, wherein the ball valve member comprises a supporting element protruding into the actuator fluid line bore.

24. The system according to claim 14, wherein the ball valve member is connected to a shaft by a connection interface which allows the valve member to be rotated by the shaft, and wherein the connection interface comprises a piston surface which is exposed to the fluid of the actuator fluid line.

25. The system according to claim 24, wherein the ball valve member comprises a through bore having a fluid bore section which extends towards the piston surface.

26. The system according to claim 14, wherein the through bore comprises two sections which are oriented at an angle of 90° in relation to each other, wherein one section is perpendicular to a rotation axis of the ball valve member and another section coincides with the rotation axis of the ball valve member.

\* \* \* \* \*